United States Patent [19] [11] 3,874,476
Monaghan [45] Apr. 1, 1975

[54] VEHICLE SAFETY DEVICE
[76] Inventor: James Monaghan, 11849 Clifton Blvd. Apt. 204A, Lakewood, Ohio 44107
[22] Filed: May 14, 1973
[21] Appl. No.: 360,344

Related U.S. Application Data
[63] Continuation-in-part of Ser. Nos. 163,329, July 16, 1971, Pat. No. 3,741,330, and Ser. No. 250,413, May 4, 1972, Pat. No. 3,759,343, which is a continuation-in-part of Ser. No. 163,379.

[52] U.S. Cl............. 180/103, 280/150 B, 297/390, 180/82 R
[51] Int. Cl............................................ B60r 21/08
[58] Field of Search......... 280/150 B; 297/384, 390; 180/103

[56] References Cited
UNITED STATES PATENTS

| | | | |
|---|---|---|---|
| 2,668,583 | 2/1954 | Singer | 280/150 B |
| 3,105,702 | 10/1963 | Larson | 280/150 B |
| 3,524,678 | 8/1970 | De Lauenne | 297/216 |
| 3,633,936 | 1/1972 | Huber | 280/150 B |
| 3,640,572 | 2/1972 | Doehler | 280/150 B |
| 3,650,542 | 3/1972 | Shimano | 280/150 B |

FOREIGN PATENTS OR APPLICATIONS

| | | | |
|---|---|---|---|
| 1,563,629 | 3/1969 | France | 280/150 B |
| 1,923,312 | 11/1970 | Germany | 280/150 B |
| 1,008,155 | 2/1952 | France | 280/150 B |
| 264,159 | 12/1964 | Australia | 280/150 B |

Primary Examiner—David Schonberg
Assistant Examiner—John P. Silverstrim
Attorney, Agent, or Firm—Teare, Teare & Sammon

[57] ABSTRACT

The disclosure relates to a vehicle occupant restraint device. The disclosed device comprises a resilient restraint pad a support crossmember and a horizontal adjustment mechanism. The horizontal adjustment mechanism, in turn, comprises a rotatable support arm for moving the crossmember and its associated pad, a transverse pivot shaft for the rotatable arm and a clutch mechanism which releasably locks the arm and its associated cross-member and pad in place. The rotatable arm is provided at one end with a transverse pivotal connection to permit rotational movement in a longitudinally extending, vertical plane and at its other end with a longitudinal pivotal connection to permit rotational movement in a trannsversely extending vertical plane.

The disclosed device may also include an automatic operation system for positively restraining an occupant upon occurrence of a vehicle accident event. This automatic operation embodiment may include means for facilitating disengagement of the adjustment mechanism during the system's operation.

22 Claims, 13 Drawing Figures 3,874,476

VEHICLE SAFETY DEVICE

CROSS REFERENCE TO RELATED APPLICATIONS

The present application is a continuation-in-part of United States Patent Application, Ser. No. 250,413, of James Monaghan, filed May 4, 1972, now U.s. Pat. No. 3,759,343, which is a continuation-in-part of United States Patent Application, Ser. No. 163,379 of James Monaghan, filed July 16, 1971, now U.S. Pat. No. 3,741,330. The present application is also a continuation-in-part of U.S. Patent Application Ser. No. 163,379.

BACKGROUND OF THE INVENTION

The present invention relates to a vehicle occupant safety device, particularly to a restraint device for an occupant, such as a driver.

Previous occupant restraining devices have usually comprised fabric safety belts which passed across a portion of the occupant's body and secured to hold the occupant in place. Once secured, these belts confined the occupant and prevented him from moving within the vehicle if he desired. In order to move within the vehicle, such as reaching for the glove compartment or for change in a pocket, the belt had to be released and was, therefore, inconvenient and potentially unsafe. In the event of an accident, the belt might jam and entrap the occupant inside the vehicle. In addition, the belt, while not in use, tended to get tangled or trapped in the seats or to drag on the floor. A physically handicapped occupant with an impaired arm or hand had difficulty in securing the belt.

Other restraining devices which were adapted for automatic operation were complex and required rearrangement or replacement of critical parts after each accident event, thereby being expensive to maintain and inoperable if successive accident events occurred. In addition, they contemplated the restraining surface passing very rapidly across a distance to contact and protect the occupant. This abrupt action may cause injury to the occupant and could instill the occupant with fear of the restraint.

The following patents discuss examples of prior art structures:

| U.S. Pat. No. | Issued to | Issued on |
| --- | --- | --- |
| 2,805,081 | Frimet | September 3, 1957 |
| 3,129,017 | Graham | April 14, 1964 |
| 3,633,936 | Huber | January 11, 1972 |
| 3,640,572 | Doehler | February 8, 1972 |
| 3,650,542 | Shimano et al | March 21, 1972; and |

Australian Patent Specification No. 264,159 to Marik, published December 17, 1964.

SUMMARY OF THE INVENTION

The vehicle occupant restraint device of the present invention comprises a resilient restraint pad, a pad support crossmember and a horizontal adjustment mechanism. The horizontal adjustment mechanism, in turn, comprises a rotatable support arm for moving the crossmember and its associated pad, a transverse pivot shaft for the rotatable arm and a clutch mechanism which releasably locks the arm and its associated crossmember and pad in place. The rotatable arm is provided at one end with a transverse pivotal connection to permit rotational movement in a longitudinally extending, vertical plane and at its other end with a longitudinal pivotal connection to permit rotational movement in a transversely extending, vertical plane.

It is an object of the present invention to protect a vehicle occupant, particularly a vehicle driver of a small car, with a light weight restraint device of optimum size and positioning and of simple construction having a minimal number of parts and a contoured support for the restraint suitable for small and average size occupants, thereby providing reliable protection at low cost.

In a modified form of the device of the present invention, an automatic operation system is provided for automatically positively restraining the occupant upon the occurrence of a vehicle accident event.

It is an object of this automatic operation embodiment to provide a pre-set, automatic passive restraint device which operates very rapidly in restraining a vehicle occupant upon the occurrence of a vehicle accident event. It is a further object of this embodiment to provide a restraint device which can be positioned in closely spaced proximity to an occupant, even a driver behind the steering wheel, to provide very rapid operation and to reduce the occupant's fear of the restraint's operation. It is a still further object of this embodiment to provide a restraint device which is completely reusable so that it may be used repeatedly for several accident events and so that it remains effective during a vehicle accident in which there are successive vehicle accident events, such as multiple collisions. It is an object of this embodiment to provide means for automatically extending the period of occupant restraint during multiple accident events, such as a collision from the front and then the side, so that the restraint is not terminated before danger ceased. It is also an object of this embodiment to provide a warning of an impending accident event by permitting actuation of the restraint device before occurrence of the vehicle accident event, thereby allowing the vehicle occupant to perceive the warning and avoid the impending accident event.

The automatic operation embodiment may be modified to provide means for facilitating operation of the clutch during the operation of the automatic system. This speeds up the operation of the device in restraining the occupant, thereby improving the automatic system from very rapid operation to ultra rapid operation. It is a further object to provide a restraint device which is convenient to operate, even for physically handicapped persons, so as to encourage use. It is also an object to provide a protective device which can also be used as an arm rest.

DESCRIPTION OF THE PREFERRED EMBODIMENT

Figure 1:
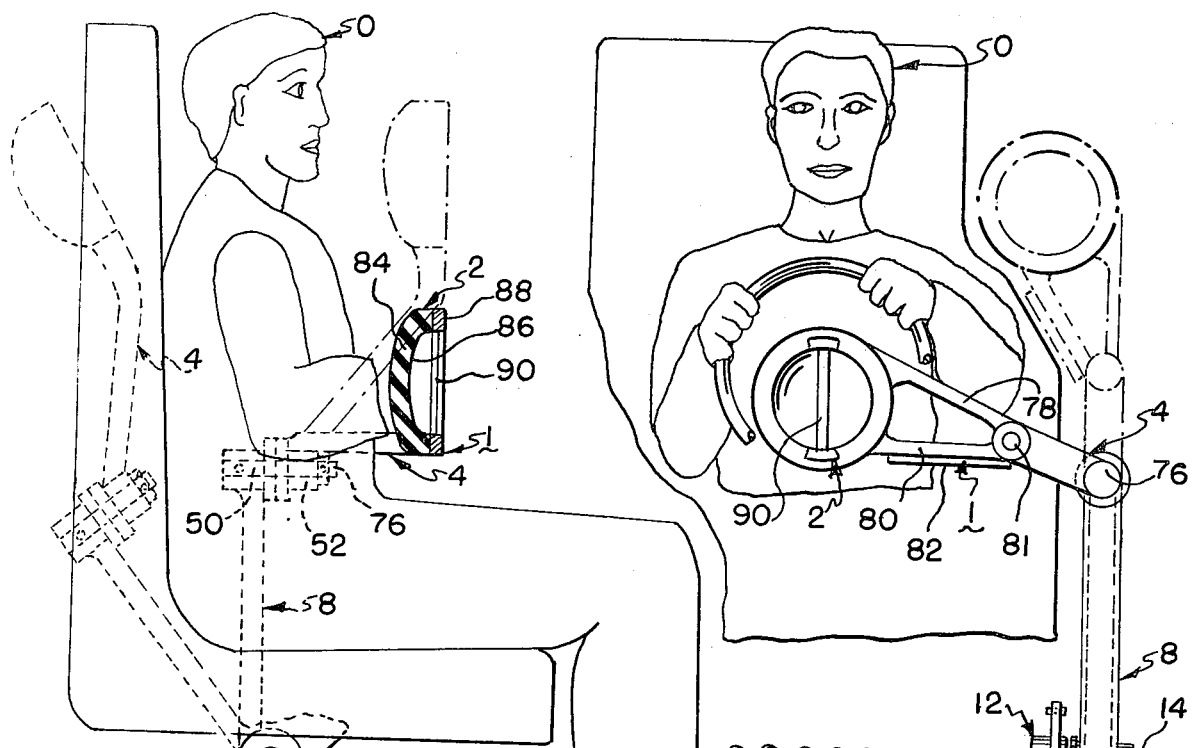
FIG. 1 is a front elevation view, partially cut away, illustrating the restraint device 1 of the present invention installed in a vehicle.

A preferred embodiment of the restraint device 1 of the present invention (as is illustrated in FIG. 1) comprises a resilient restraint pad 2, a pad support crossmember 4 and a horizontal adjustment mechanism and is particularly adapted for use by a vehicle driver. The horizontal adjustment mechanism, in turn, comprises a rotatable support arm 8 for moving the crossmember 4 and its associated pad 2, a transverse pivot shaft 10 for the arm 8 and a clutch mechanism 12 which releasably locks the arm 8 and its associated crossmember 4 and pad 2 in place. The rotatable arm 8 is provided at one end with a transverse pivotal connection to permit rotational movement in a longitudinally extending, vertical plane and at its other end with a longitudinal pivotal connection to permit rotational movement in a transversely extending, vertical plane, thereby providing a simple construction for effectively operating the device 1. The foregoing construction releasably locks the restraint pad 2 in a horizontally adjusted position conveniently in proximity with the front of the occupant's torso and restrains him from striking the forward portions of the vehicle while utilizing a simple, minimal structure in front of the occupant 0.

Figure 2:
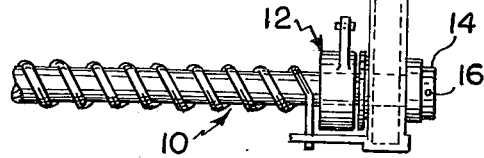
FIG. 2 is a side elevation view, partially cut away and partially in section, illustrating the device of FIG. 1.

In operating the device 1 from its retracted position (the dotted line showing in FIG. 2) in which the pad 2 is in its uppermost position and situated rearwardly of the occupant, the occupant reaches up to a convenient shoulder height and grasps the crossmember 4. He then pulls the crossmember 4 forward to a ready position (the dot-dash showing of FIGS. 1 and 2) slightly in front of him. Then he draws the pad 2 and its associated crossmember 4 down in front of him and adjusts the horizontal spacing of the pad with respect to his torso, so that it is located adjacent his center of gravity as he is sitting. On completion of the adjustment, he locks the clutch 12 to preserve this spacing. If the occupant later wants to withdraw the restraint without affecting this adjustment, he needs only to temporarily lift the crossmember 4 and pad 2 back into the ready position. During this operation, the clutch 12 remains locked in the adjusted position until released.

In the preferred form of the restraint device 1, the transverse pivot shaft 10 is stationary and mounted on and supported by the occupant's seat assembly. This mounting site permits the occupant to adjust his seat forward or backward with respect to the vehicle without affecting the horizontal orientation of the device 1 with respect to himself. Where the seat's angular orientation can be adjusted, such as by canting backward, it is preferred that the shaft 10 be mounted on the seat so as to angularly move with the seat and occupant.

The transverse orientation of the shaft 10 with respect to the vehicle and occupant provides a transverse pivot axis for the rotation of the rotatable support arm 8 in a longitudinally extending, vertical plane. To provide firm mounting of the device 1, the opposed or free end of the shaft 10 is fixedly secured to the vehicle, preferably to the seat, as aforesaid.

Figure 5:
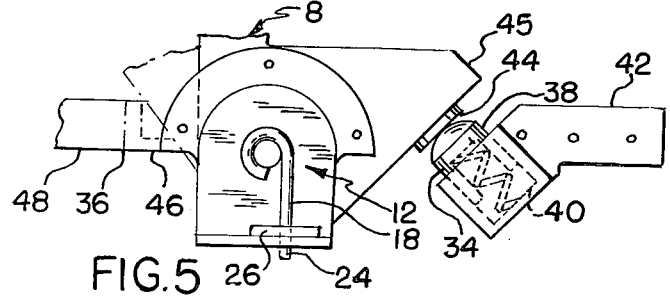
FIG. 5 is a fragmentary side elevation view along the line 5—5 of FIG. 4.
Figure 5A:
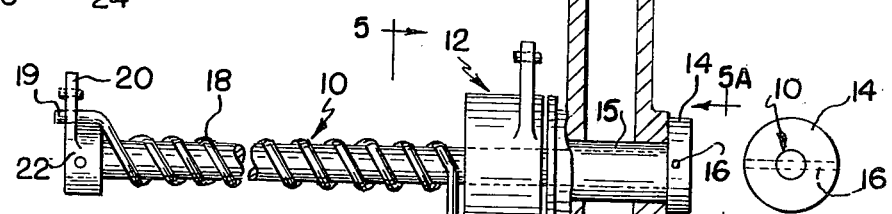
FIG. 5A is a side elevation view along the line 5A—5A of FIG. 4.
Figures 3, 4:
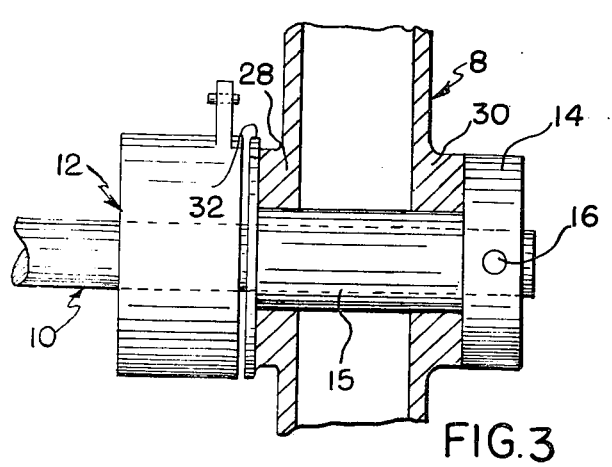
FIG. 3 is an enlarged, fragmentary front elevation view, partially cut away and partially in section, illustrating the clutch 12 and lower end of rotatable arm 8 of FIG. 1.
FIG. 4 is a fragmentary front elevation view, partially cut away and partially in section, of the lower portion of the device of FIG. 1.
Figure 6:
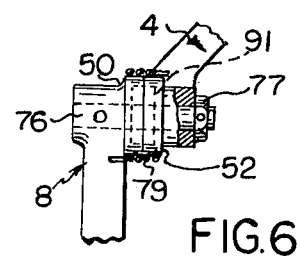
FIG. 6 is a fragmentary side elevation view partially in section, of the connection of arm 8 to crossmember 4.

The rotating arm 8, as may be seen in FIG. 4, is biased and urged rearwardly by a helical torsion spring 18 on the shaft 10 so that the arm 8 will tend to rotate rearwardly when it is free to rotate. The convolutions of this spring 18 encompass the shaft 10 and extend lengthwise of it, thereby saving space. If desired, a tubular cover for the spring 18 can be provided which encompasses both it and the shaft 10. One end 19 of the spring 18 is fixedly mounted to the shaft 10 by an arm 20 of a stationary collar 22 affixed to the shaft. The opposite end 24 of spring 18 is rotationally moveable and engages an arm 26 extending transversely from the lower end of the rotatable support arm 8 (FIGS. 4 and 5). This provides the aforementioned rearward biasing of the rotatable arm 8. The arm 26 may be mounted on a removable plate 27 bolted to the lower end of the arm 8 for easy disengagement of the spring 18.

The rotatable arm 8 is rotatably attached at its lower end to the transverse pivot shaft 10 so that it will rotate in a longitudinally extending, vertical plane which extends longitudinally of the vehicle and also perpendicularly to the general plane of the occupant's torso. Preferably, it is mounted on the outer end of the transverse pivot shaft 10 so that it is situated between the occupant and the outside of the vehicle, thereby providing convenient access to it. Preferably, the arm 8 is secured to the rod 10 by an annular collar 14 and a lock pin 16 (FIGS. 1, 3, 4 and 5A) which are affixed to the pivot shaft 10. The transverse positioning of the arm 8 on the shaft 10 is effected by the same collar 14 and the clutch 12.

The lower end of the rotatable arm 8 is provided with inner and outer circular bosses, 28 and 30 respectively, which are journaled for rotation on an internal extension 15 of the collar 14 (FIG. 3) and which act as bearings for the arm 8. Both bosses 28 and 30 also act to transversely position the arm 8 on the shaft 10. The internal extension 15 of collar 14 permits the arm 8 to shift transversely inwardly on actuation of the electromagnetic clutch 12. The inner face of collar 14 limits outward transverse shift of the arm 8. The exposed inner face of the inner boss 28 is provided with a magnetizable friction disk or pad 32 which, on actuation of the electromagnetic clutch 12, coacts with the clutch 12 to lock the arm 8 in a fixed position. This locking action also locks the horizontal position of the restraint pad 2, as well, through the crossmember 4. The actuation of the electromagnetic clutch 12 causes the disk 32 to draw against the confronting face of the stationary clutch 12 to cause this locking.

The forward and rearward rotation of the pivoted arm 8 is confined to a limited angle, such as 35°, by the front and rear stops (FIG. 5), 34 and 36 respectively. In the form shown, the front stop 34 comprises a spring loaded piston 38 which rides in a cylindrical bore 40 in a front stop support bracket 42 to provide a resilient, fail safe action. The piston 38 has a convex fact which abuts against a wear plate 44 on the forward side of a foot 45 extending forwardly and outwardly from the lower part of the arm 8. The foot 45 is angularly disposed with respect to the remainder of arm 8 so that the foot 45 abuts the stop 34 when the pad 2 is in its full forward position. Preferably, the piston's axis of movement is depressed at an angle of about 45° from the vertical so that the lower surface of the foot 45 can swing forward about 45° from the vertical. When the arm 8 is pivoted forward and the lower surface of the foot 45 is depressed forward more than 45° from the vertical (such as during a slippage of the clutch 12 on severe impact in an accident), the spring-urged, forward stop 34 would resiliently resist this extreme depression until the forward force pushed the piston face below the cylinder mouth, at which point the lower surface of the foot 45 would finally abut the rigid support bracket 42 and the arm 8 would be rigidly stopped in its forward travel. This provides the aforesaid resilient, fail safe action. The rear stop 36 is rigid and comprises a longitudinal support bracket 48 and an L-shaped stop bracket 46 which extends transversely of it and limits the rearward rotation of the support arm 8. This stop 36 is oriented so that the pivoted arm 8 can be rearwardly depressed about 35° from the vertical.

In its restraining position, the arm 8 extends generally vertically upwardly from the foot 45 in a generally straight line until it reaches a position adjacent the occupant's proximal elbow. The lower surface of the foot 45 is inclined about 45° from the longitudinally central axis of the arm 8. In order to provide a light weight construction the arm 8 may be tubular.

The upper end of arm 8 mounts the crossmember 4 for limited rotational movement about a generally longitudinally extending pivot so that the crossmember 4 and pad 2 rotate in a transversely extending vertical plane. The upper end of the arm 8 is provided with an apertured boss 50 for mounting the crossmember 4. The lower end of the crossmember 4. is also provided with an apertured boss 52. Preferably, the confronting portion of the bosses 50 and 52 are enlarged to house and enclose a master switch 91 for controlling the clutch 12, as will be discussed later. The apertures in the bosses 50 and 52 extend in a generally longitudinal direction and are bored to receive a generally longitudinally extending pivot pin 76 which is held in place at one end in the boss 50 with a lock pin. The shaft's other end passes through boss 52, and a lock nut is affixed to this end to prevent separation of the bosses 50 and 52 and the associated arm 8 and crossmember 4 under load. If desired, the shaft 76 may comprise an integral stub shaft extending outwardly from the boss 50. This permits the crossmember 4 and the pad 2 to rotate in a generally transverse, vertical plane from a position in front of the occupant to a position adjacent his proximal shoulder (FIG. 1). Consequently, in the form shown, the arm 8 has a transverse pivotal connection at its lower end which permits rotation in a generally longitudinal, vertical plane and a longitudinal pivotal connection at its upper end which permits rotation in a generally transverse, vertical plane of crossmember 4 and pad 2 generally parallel to the general plane of the occupant's torso.

In this way, the crossmember 4 and pad 2 may be rotated in and out of position in a transversely extending vertical plane. Preferably, rotation is through a limited angle, such as 60°. The crossmember 4 is preferably releasably locked at each limit of its rotation such as by an impact, or shock-proof, springloaded detent (not shown) which fits into a pair of angularly spaced apertures or depressions (not shown). In this way, the crossmember 4 may be releasably locked in either a vertical position or a position which is depressed 60° from the vertical. To prevent rotational travel beyond these releasable locking points a limiting stop, such as is known in the art, should be provided at each limit of the arm's travel. To facilitate the occupant in lifting and returning the crossmember 4 and pad 2 to the vertical position, a balancing spring 79 may be provided around bosses 50 and 52. Preferably, the spring 79 is a helical torsion spring.

In its preferred form the crossmember 4 is bifurcated or Y-shaped with upper and lower supports, 78 and 80, respectively, attaching the restraint pad 2 to the crossmember 4. The upper support 78 follows the general axis of the crossmember while the lower support 80 diverges outwardly and downwardly away from this axis so that the upper ends of the supports 78 and 80 attach to the pad 2 at spaced points on the pad's periphery. Each of these supports 78 and 80 provide convenient hand grips for moving the device 1. Preferably, a clutch actuation switch 81 is mounted at the junction of the supports 78 and 80 with a switch level 82 extending along the lower edge of the support 80 to provide convenient actuation of the clutch 12. This construction permits single hand use of the device 1.

The restraint pad 2 is preferably made of a resilient material, such as foam rubber, with a circular configuration when viewed in front elevation. In side elevation, the front, or proximal, surface 84 to the occupant 0 is convex, and the rear, or distal, surface 86 is concave to gradually cushion and restrain the impact of the occupant. The convex surface 84 confronting the occupant also permits the pad 2 to contact the occupant in an angular, or non-parallel, orientation without an undesired outer marginal edge of the device contacting him. In this way, the general transverse plane of the pad 2 does not have to be parallel to the general plane of the occupant's torso at the point of contact. A circular reinforcement ring 88 is embedded into the distal surface of the pad to preserve its circular configuration and provide mounting points for the crossmember 4. Preferably, the pad 2 has a rotatable handgrip 90 which the occupant can grasp. As shown, this grip 90 extends across the interior of the concavity formed by the surface 86 and slides on the reinforcing ring 88. Preferably, the occupant's seat is provided with side projections which, in conjunction with the pad 2, retain the occupant's torso in place during transverse or sidewise movement of the vehicle during an accident event, thereby acting as torso side restraints.

In a typical operation of the device 1, the device 1 is initially positioned in a retracted position (FIG. 2, dotted line showing) with the restraint pad 2 located to the rear of the occupant slightly above his outer shoulder.

In this position, the spring 18 has depressed the rotatable arm 8 rearwardly from the vertical and the crossmember 4 and the pad 2 are all in an upright position. To use the device 1, the occupant grasps either the lower crossmember support 80 or the pad handgrip 90 and draws the pad 2 forward to a ready position (FIG. 2, dot-dash position) with the pad 2 at approximately the desired horizontal spacing away from the transverse vertical plane crossing the front of his torso. In this position, the crossmember 4 and the pad 2 are still generally upright, but the rotatable arm 8 has been rotated forward against the force of spring 18. The clutch 12 has not yet been actuated so that release of the handgrip by the occupant would allow the device to return to its retracted position.

Next, the occupant pivots the pad 2 and the crossmember 4 transversely down to put the pad 2 in its lowest position and makes the final adjustment of the horizontal spacing between the pad 2 and his torso. With the pad 2 and crossmember 4 in this final position, he actuates the clutch actuating switch 81, thereby locking the clutch 12 and the rotatable arm 8 in position.

If, while riding, the occupant should desire to temporarily remove the restraint, he need only lift the pad 2 back into the ready position. He can then return the pad to its adjusted position without further adjustment. A suitable warning system can be provided to prevent operation of the vehicle without the restraint pad 2 being down in position to protect the rider's torso.

To retract the device 1 to its initial position, the occupant need only raise the pad 2 and crossmember 4 to the ready position and actuate the clutch actuating switch from the ready position. This releases the clutch and the pad 2 can be allowed to retract to the initial position using the force of the spring 18.

Figure 7:
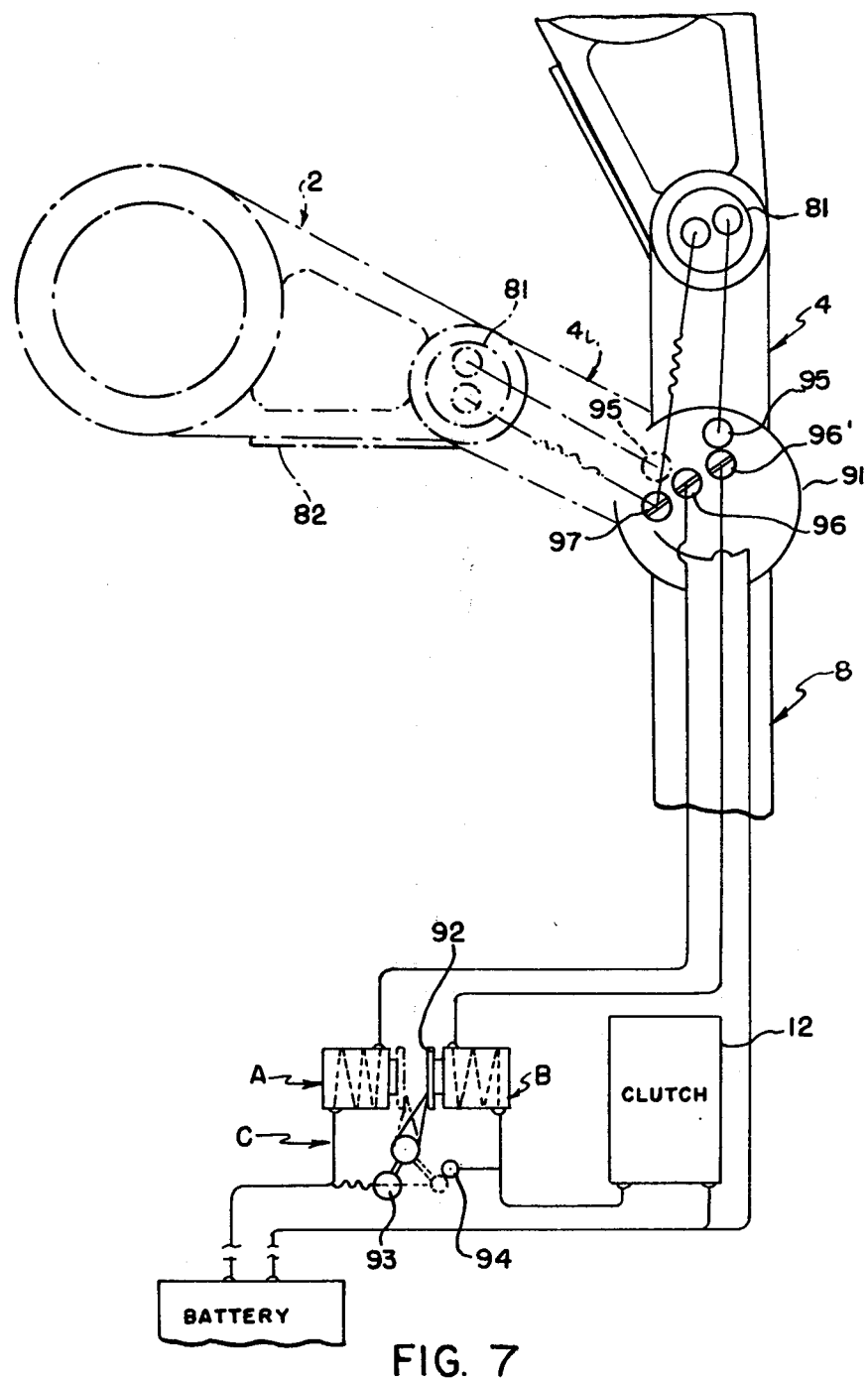
FIG. 7 is a diagrammatic representation of the clutch actuation system of the preferred embodiment of the present invention.

More specifically, FIG. 7 diagrammatically illustrates the electrical system for engaging and disengaging the electromagnetic clutch 12. This system uses a locking type relay C which has a coil A to engage the clutch 12 and a separate coil B to disengage the clutch 12. A two-position master switch 91 is mounted at the juncture of the crossmember 4 and the arm 8, such as within the bosses 50 and 52, so that rotation of the pad 2 and crossmember 4 will alternately permit actuation of either the engaging relay coil A or the disengaging relay coil B by the single hand switch 81. In a typical operation of the electrical system with the pad 2 in the ready position, the clutch 12 is disengaged. In this condition, a pivoted contact lever 92 is held over against the disengaging relay coil B by a spring (not shown) with a clutch control contact 93 on its lower end out of electrical contact with clutch contact point 94. As the pad 2 and crossmember 4 are swung down to the restraint position (FIG. 7, dot-dash line showing), movable contact 95 attached to the crossmember 4 is moved into electrical contact with an engaging coil contact 96 in the master switch 91. When the electrical contacts in the hand switch are closed, such as by actuating the hand lever 82, electrical energy flows from one pole of the vehicle's battery through the clutch engaging coil A, the engaging contacts 95 and 96, the hand switch 81, the stationary pivot contact 97 in the master switch 91, and back to the opposite pole of the battery, thereby energizing the engaging relay coil A. This causes the contact lever 92 to be pulled away from relay coil B over to relay coil A where it is held by a spring (not shown). This swinging brings the contact 93 into engagement with contact 94, thereby causing electrical energy to flow from one pole of the battery through contacts 93 and 94 and the electromagnetic clutch 12 and back to the opposite pole of the battery, energizing the clutch 12 and drawing the disc 32 against it. Subsequent opening or closing of the contacts in the hand switch 81 has no affect on the clutch 12 which is locked in its engaged condition until the pad 2 and crossmember 4 are again raised to the vertical ready position.

In order to disengage the clutch 12, the occupant must raise the pad 2 and crossmember 4 to the aforesaid vertical ready position. In this position, the contact 95 has rotated to engage the disengaging contact 96' of the master switch 91. On actuation of the hand switch 81 in this position, electrical energy flows from one pole of the battery through the contacts 93 and 94 (which are still in contact) the relay coil B, the contacts 95 and 96', the engaging contacts of the hand switch 81, the pivot contact 97 and back to the opposite pole of the battery. This flow energizes the relay coil B, pulling the contact lever 92 away from relay coil A and toward relay coil B where it is held by a spring (not shown), thereby breaking the contact between contacts 93 and 94 and de-energizing the clutch 12. Preferably, the connecting wires between the battery and contact 93 and between contact 97 and hand switch 81 should be provided with retractable coiled springs so that the contact lever 92 and crossmember 4, respectively, can rotate. Where desired, the device 1 may be wired so that the vehicle's ignition cannot be operated without the pad 2 being in the horizontally adjusted, restraint position.

Figure 4B:
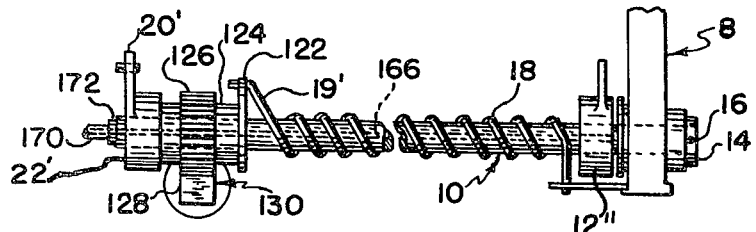
FIG. 4B is a fragmentary front elevation view illustrating a further modified embodiment of the lower portion illustrated in FIG. 4.
Figure 8A:
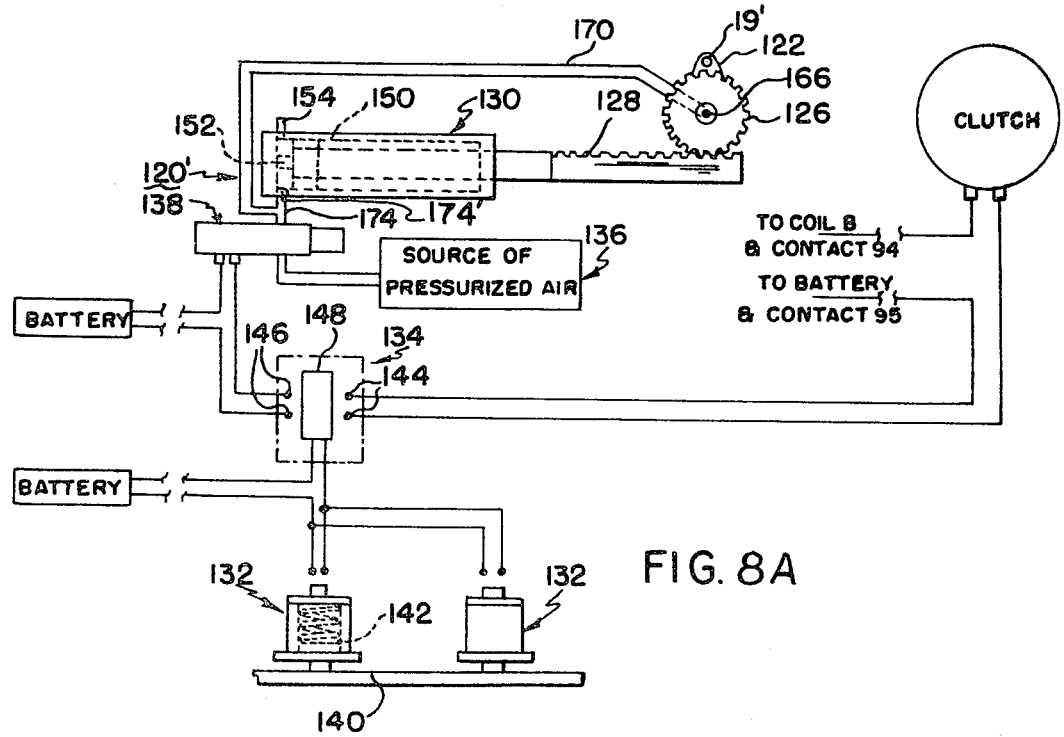
FIG. 8A is a diagrammatic representation of a modified embodiment 120' of the automatic restraint system shown in FIG. 8.
Figure 4A:
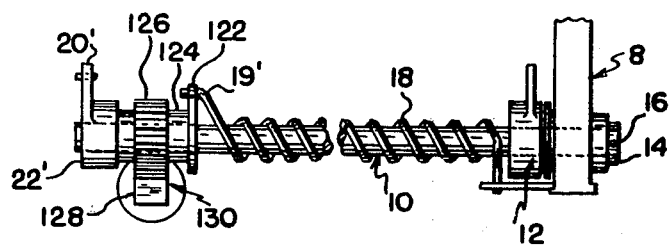
FIG. 4A is a fragmentary front elevation view illustrating a modified embodiment of the lower portion illustrated in FIG. 4.
Figure 8:
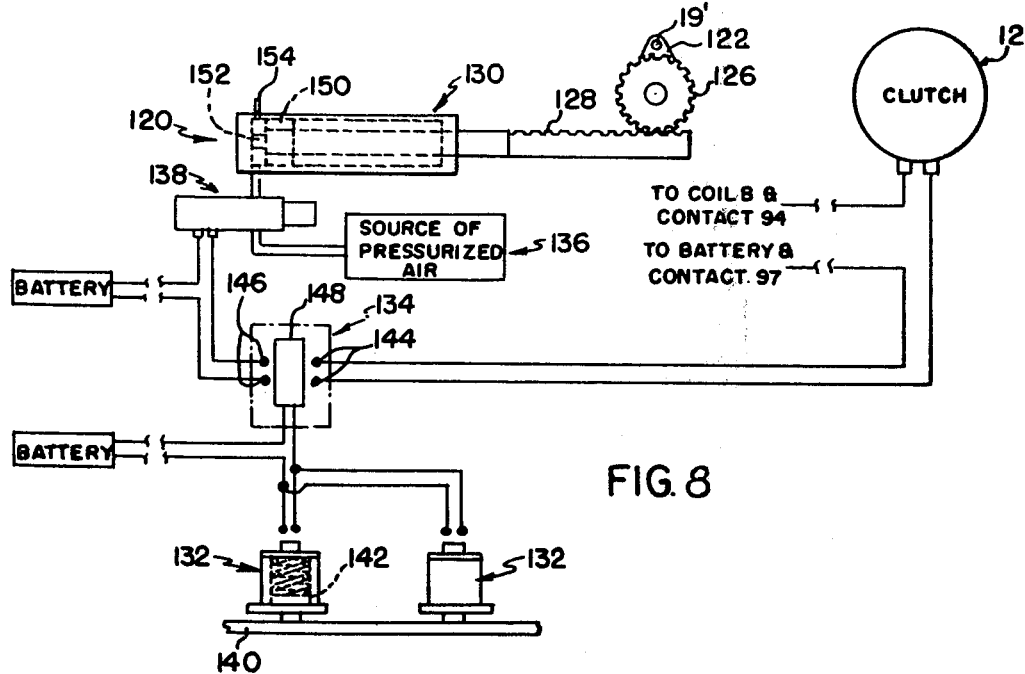
FIG. 8 is a diagrammatic representation of the automatic restraint system 120 of a preset automatic positive restraint embodiment of the present invention.

In FIGS. 4A and 8 there is shown a modified embodiment of the present invention which provides a preset automatic positive restraint of the occupant on impact. In this embodiment an automatic restraint system 120 senses an accident impact to the vehicle and increases the rearward directing force applied to the rotatable arm 8 while releasing the clutch 12.

In the form shown, the stationary collar 22' is modified so that the arm 20' is used for attaching the collar 22' and shaft 10 to the vehicle and not for securing the interior end 19' of the spring 18. Instead, the interior end 19' is attached to an end plate or arm 122 mounted on the exterior end of a rotatable sleeve 124. This sleeve 124 is rotatable on the shaft 10 so that the torsion of spring 18 can be increased. The increased torsion is effected by a gear 126 mounted on the sleeve 124 being driven by a rack 128 powered by pneumatic cylinder 130. On actuation of the pneumatic cylinder 130, the rack 128 drives the gear 126, thereby rotating the sleeve 124 and increasing the torsion on the spring 18. The increased tension, in turn, increases the rearward force on the rotatable arm 8 and its associated restraint pad 2. By this arrangement, the rearward force of the restraint pad gradually increases as the rack 128 travels through its throw and the ultimate force of the pad against the occupant can be pre-determined.

The cylinder 130 is actuated upon the sensing of a vehicle accident event, such as an accident impact, by the electromechanical portion of the system 120. This portion also releases the clutch 12 so that the increased tension of spring 18 will move the arm 8 and its associated pad 2 rearward to automatically positively restrain the occupant.

In the form shown, this portion of the system comprises at least one robust impact sensor 132, a dual function switch 134 for releasing the clutch 12 and actuating the cylinder 130, a source of pressurized air 136, a solenoid valve 138 for connecting the air source 136 to the cylinder 130 on actuation by switch 134, and the vehicle battery for supplying electrical energy to the appropriate foregoing components.

As shown, each sensor 132 is of robust construction and comprises a shield 140 which protects the sensor against accidental actuation, and a press fit or spring biased plunger 142 which closes a pair of switching contacts when pushed in. The force of an accident impact would crush or dent the shield 140 and push in the plunger 142. Preferably, a plurality of sensors 132 are disposed on the vehicle's periphery and wired in parallel so that an impact from the front, side, or rear would actuate the system. It should be understood that while impact sensors have been discussed, other appropriate sensing devices, such as proximity sensors, deceleration sensors or distance sensing, electronic sensors could be used. A deceleration sensor may be provided in order to protect the occupant during rapid deceleration, such as panic stops in which there is no collision or impact. Distance sensing, electronic sensors, such as sonar, laser beam, or radar sensors, may be provided on the front of the vehicle to actuate the system 120 when a distant object is sensed, thereby giving greater security. A single variable range, electronic sensor mounted on the front of the car could be used. The range could be varied either automatically or manually according to driving conditions or speed, including longer ranges for sensing objects in a heavy fog. Accordingly, combinations of the aforesaid sensors can be used as desired. If desired, a switch, or similar deactivating means, can be connected to each sensor so as to deactivate the sensor if it remains permanently activated after an accident.

The dual function switch 134 is preferably constructed with a first pair of switching contacts 144 normally closed for controlling the clutch 12 and preserving its horizontal adjustment energization and with a second pair of switching contacts 146 which are normally open for controlling valve 138. On energization of a coil 148 by a sensor 132, contacts 144 are opened (de-energizing clutch 12) and contacts 146 closed (energizing valve 138). Preferably, the switch 134 is of a time delay type so that after a predetermined period of energization, such as one to two seconds, contacts 146 re-open, thereby releasing the increased rearward force of the pad 2 so that the occupant can either leave the vehicle or resume operation of it. Suitable means may be provided for extending the time delay period during multiple accident events, such as a collision from the front and then the side. Consequently, if the activating signals from several sensors overlap, the time period would be automatically extended to protect the passenger. In addition, the switch 134 preferably is resettable so that the contacts 144 can be reclosed even with the sensor 132 actuated. This would permit use of the normal horizontal adjustment feature in operating the vehicle after an accident impact until the sensor was repaired or otherwise de-activated.

The valve 138 is preferably a spring return solenoid pneumatic valve so that high pressure air will flow through it only during its period of energization. High pressure air is selectively transmitted from source 136 to the cylinder 130 via this valve 138. The pressure source 136 may comprise either a compressor or a replaceable, pressurized gas container.

The cylinder 130 is preferably a single acting pneumatic cylinder with rack 128 attached to one face of its piston 150. The other face of the piston is provided with a stop 152 with a diameter less than that of the interior wall of the cylinder 130 so as to provide an annular space at the rear of the cylinder 130 for high pressure air to enter. The return to the rack's de-energized position is effected by the tension of spring 18 and the escape of air through a reduced diameter escape port 154. This port 154 has a reduced diameter so that, while a small amount of energizing air can escape through it during actuation, it does not materially hinder the actuation of cylinder 130.

In a typical operation of the foregoing modification of the present invention in which the pad 2 is located in its horizontally adjusted restraint position, the following events would occur. On accident impact, a sensor 132 would be actuated. This would close the circuit between the actuated sensor 132, the battery, and the switch coil 148, thereby actuating coil 148. Actuation of coil 148 would open contacts 144 and close contacts 146. The opening of contacts 144 would break the circuit between the clutch 12, the battery, the switch 134 and the horizontal adjustment circuit shown in FIG. 7, thereby releasing the clutch 12. At the same time, the closing of contacts 146 would close the circuit between the battery, the switch 134, and valve 138, thereby actuating valve 138. The actuation of valve 138 would, in turn, communicate the cylinder 130 with the source of pressurized air 136, thereby actuating the cylinder 130 and forcing the rack 128 outwardly. This movement of the rack, via sleeve 124, increases the tension on spring 18. With the clutch 12 released, the arms 8 and 4 and the pad 2 would move rearwardly from the restraint position until the pad 2 contacted the occupant's torso. Since the rack's movement and consequent spring tension has just commenced, the pad 2 would contact the occupant's torso at a relatively low force value. This would minimize impact shock from the pad 2. As the rack 128 continued its travel, the force of the pad 2 against the occupant would increase until maximum rack travel and force was reached and the occupant would be resiliently clamped in place. At a predetermined time after actuation of sensor 132, the time delay feature of switch 134 would de-activate the cylinder and the rack 128 and spring tension would return to their original condition. This would reduce the force of the pad against the occupant to its normal value so that the restraint pad 2 could be readily moved out of position.

Since the device 1 is reusable, the system 120 may be modified to permit testing of its operation by wiring a switch into the system in the same manner as a sensor. The switch can be mounted on the vehicle's dashboard. When the switch is closed, it would simulate an activated sensor, thereby activating the system 120. This permits the car owner to personally regularly test the effectiveness of his restraint system. The various types of sensors may be checked in accordance with their manufacturer's instructions regarding test procedure and frequency.

Figure 3A:
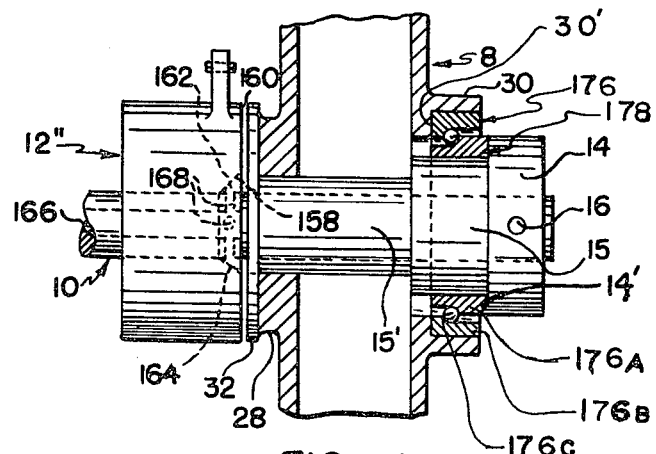
FIG. 3A is an enlarged fragmentary front elevation view, partially cut away and partially in section, illustrating a modified embodiment of the clutch mechanism illustrated in FIG. 3.

By slightly modifying the structure of the electromagnetic clutch 12 and the embodiment of the automatic restraint system 120, it is possible to reduce the time required to release the clutch 12 after an accident impact by providing a quick release means on the clutch. On clutch release at impact, friction pad 32 should freely rotate a fraction of a revolution to complete vehicle occupant restraint. However, without spaced separation, the clutch faces might tend to remain in loose frictional contact, thereby reducing complete freedom of rotation of pad 32. It is preferred that the clutch faces be forcibly separated contemporaneously with the clutch de-energization. This separation becomes more important after a vehicle has been in use for some time when clutch faces may be roughened by wear, or may have some residue of magnetism. FIG. 3A illustrates a preferred embodiment of this modified clutch 12'' in which an air jet arrangement 158 is used to facilitate separation of the friction pad 32 from the clutch 12''. In this embodiment, the outer face 160 of the clutch 12'' is internally champfered at its edge of intersection with the shaft 10. This provides an annular air space 162 which extends around the circumference of the shaft 10 and which is defined by the outer circumference of the shaft 10, the outwardly inclined chamfer surface 164, and the confronting face of the friction pad 32 (when the clutch 12'' is engaged).

The shaft 10' is provided with a centrally-disposed, axially extending internal bore or passageway 166 (FIG. 4B) which extends internally from the end of the shaft 10 adjacent the collar 22' to a point adjacent the outer face of clutch 12''. A plurality of open ports 168 extend radially outwardly from the bore 166 at a point adjacent to the outer face and communicate the bore 166 with the air space 162. The end of the bore 166 adjacent to the collar 22' is joined to an air supply conduit 170 by a coupling 172 so that the air space 162 is capable of being supplied with pressurized air.

In this embodiment of the automatic restraint system, the air space 162 is selectively supplied with pressurized air when the clutch 12'' is de-energized so that the air supplied may press outwardly against the pad 32 and force it outwardly from the clutch 12'' to a position where it is spaced from the clutch 12''. The supplied air would also pass into and through the resulting space, blowing away dust and establishing a lubricating air film between the outer face 160 of the clutch 12'' and the friction pad 32. To facilitate and speed the outward movement of the pad 32, and to minimize the resultant outward thrust effect due to the pressurized air, the outer boss 30 of the rotatable arm 8 may be provided with a radial ball thrust bearing assembly 176 comprising an inner race 176a, an outer race 176b, a plurality of ball bearings 176c, and a bearing cage (not shown). This bearing assembly 176 is disposed within a bearing retension cavity 178 with the inner race 176a seated against the face 14' of the collar 14, while mounted on the enlarged diameter extension 15 and with the outer race 176b seated against the shoulder 30' of the boss 30.

In the modified embodiment of the automatic restraint system 120', FIG. 8A, the air space 162 is preferably selectively supplied with pressurized air by tapping the supply conduit 170 into the air conduit 174 which communicates the cylinder 130 with the valve 138. By this arrangement, upon actuation of the valve 138 to actuate cylinder 130, pressurized air would also actuate the air jet 158 by passing through the supply conduit 170, the internal bore 166 and the ports 168 and into the air space 162. Since the clutch 12'' would be de-energized, the pressurized air would force the pad 32 away from the clutch face 160. The bearing assembly 176 would facilitate this outward movement. In other respects, the automatic restraint system 120' would be constructed and would operate the same as the previously discussed automatic restraint system 120.

The accident sensing device as shown actuates three contemporaneous operations-magnetic clutch release, air jet clutch separation, and air cylinder spring pressure intensification — with the possibility of differential timing between these operations. It is preferable that the clutch release and clutch separation should be simultaneous, but that the spring pressure intensification should not precede the clutch release and separation operations.

Differential timing of the air units 158 and 130 to slightly delay the completion of the operation of the air cylinder 130 with respect to the air jet actuation can be obtained by the select sizing of the cylinder's air entrance port 174' in relation to the air jet ports 168. This can insure that the restraint pad contacts the occupant's torso prior to the effective spring intensification.

Differential timing can also be obtained electrically by installing a suitable time delay circuit and providing an independent supply of pressurized air to the air jet 158. In this instance, the supply conduit 170 could be communicated directly to the source of pressurized air 136 and provided with a selectively actuable valve, such as a spring return, solenoid pneumatic valve similar to valve 138, connected to contacts 146 of switch 134. A suitable time delay circuit would be connected between the valve 138 and the contacts 146 to give the following sequence. For example, with the time delay circuit connected as aforesaid it would insure that the complete energization of the cylinder 130 would not precede the operation to separate the clutch faces by air jet.

Other methods of clutch face separation could be used, for example, by placing a coiled compression spring between the clutch faces and around shaft 10. This, however, would require an increase in magnetic clutch power to close the clutch while overcoming the spring's force, and would add some rotational friction to clutch pad 32. Also, it does not lend itself to the aforesaid time differential control. Therefore, the forcible separation of the clutch faces by air is the preferred embodiment.

While the clutch 12 has been described as an electromagnetic clutch, it can be electro-pneumatic, using only pneumatic power for clutch, jets and pad pressure intensification from a compressor or replaceable air cylinder.

By the foregoing arrangement of elements and their interrelationship, the restraint device of the present invention protects the vehicle occupant with an optimally sized and positioned restraint of simple construction and minimum parts. This provides reliable protection at low cost. The use of a rotatable support arm with a transverse pivotal connection at one end and a longitudinal pivotal connection at its other end provides this simplicity. The non-automatic restraint device can be readily modified to provide a preset, automatic passive restraint for automatically and positively restraining the occupant upon the occurrence of a vehicle accident event. This preset passive restraint embodiment provides a very rapidly operating restraint by permitting the positioning of the restraint in closely spaced proximity to the occupant, even a driver. This embodiment also reduces the occupant's fear of the restraint's operation since the restraint operates through a short distance rather than a great distance. Since the automated restraint device is fully reusable, it can be used repeatedly for several accident events or for a single accident in which there are successive accident events, such as multiple collisions. The automated device may also provide a warning of an impending accident event to the driver. By slightly modifying the automatic operation embodiment of the device, the operation of its clutch can be facilitated by the operation of the automatic air jets. This speeds up the operation of the device in restraining the occupant, thereby providing ultra-rapid operation. The device may also be easily operated, even by the physically handicapped.

The terms and expressions which have been used are used as terms of description and not of limitation, and there is no intention in the use of such terms and descriptions of excluding any equivalents of any of the features shown and described, or portions thereof, and it is recognized that various modifications are possible within the scope of the invention claimed.

I claim:

1. A reusable vehicle safety device adapted for restraining a vehicle driver from movement and being particularly adapted to permit the driver to vacate his seat in either lateral direction without delay in order to minimize entrapment, said device being capable of operation to emplace, position or remove the same by using one hand, said device comprising,
    a resilient restraint pad,
    a transversely extending rigid crossmember supporting said pad thereon,
    adjustment means for manually adjusting said restraint pad between a restraint position in front of and in close proximity to the driver's torso, and a retracted storage position permitting said driver to vacate his seat in either lateral direction,
    said adjustment means operatively connecting said transverse crossmember to said vehicle and including,
    a transversely extending pivot shaft mounted on said vehicle,
    a rotatable support arm pivotally connected at one end thereof to said pivot shaft to permit rotation of said rotatable arm in a longitudinally extending vertical plane disposed between the occupant's torso and the vehicle's adjacent exterior, between said storage position rearwardly of said driver and a holding position forwardly of said driver,
    said support arm pivotally connected at the other end thereof to said crossmember to permit rotation of said restraint pad in a transversely extending vertical plane, between said restraint position and said holding position, and
    a clutch mechanism for releasably locking said device in said restraint position and in said holding position,
    said clutch mechanism including manually actuated release means on said crossmember for releasing said clutch mechanism to enable movement of said device, whereby said device may be moved between said restraint position, said holding position, and said storage position by said driver actuating said release means and moving said device with one hand,
    sensing means for sensing a vehicle accident event effective when said restraint pad is in said restraint position,
    power means for moving said restraint pad from said restraint position into contacting engagement with said driver, and
    actuation means for actuating said release means to release said clutch mechanism and actuate said power means upon the sensing of an accident event by said sensing means to move said restraint pad into contact with said driver.

2. A reusable vehicle safety device adapted for restraining a vehicle driver from movement and being particularly adapted to permit the driver to vacate his seat in either lateral direction without delay in order to minimize entrapment, said device being capable of operation to emplace, position or remove the same by using one hand, said device comprising,
    a resilient restraint pad,
    a transversely extending rigid crossmember supporting said pad thereon,
    adjustment means for manually adjusting said restraint pad between a restraint position in front of and in close proximity to the driver's torso, and a retracted storage position permitting said driver to vacate his seat in either lateral direction,
    said adjustment means operatively connecting said transverse crossmember to said vehicle and including
    a transversely extending pivot shaft mounted on said vehicle,
    a rotatable support arm pivotally connected to one end thereof to said pivot shaft to permit rotation of said rotatable arm in a longitudinally extending vertical plane disposed between the occupant's torso and the vehicle's adjacent exterior, between said storage position rearwardly of said driver and a holding position forwardly of said driver,
    said support arm pivotally connected at the other end thereof to said crossmember to permit rotation of said restraint pad in a transversely extending vertical plane, between said restraint position and said holding position, and
    a clutch mechanism for releasably locking said device in said restraint position and in said holding position,
    said clutch mechanism including manually actuated release means on said crossmember for releasing said clutch mechanism to enable movement of said device, whereby said device may be moved between said restraint position, said holding position, and said storage position by said driver actuating said release means and moving said device with one hand.

3. A safety device in accordance with claim 2, wherein
    a longitudinally extending pivot pin interconnects said crossmember and said rotatable arm to permit said rotation in said transversely extending vertical plane.

4. A safety device in accordance with claim 2, wherein
    said manually actuated release means includes a hand grip on said cross member to permit movement of the cross member and actuation of the clutch mechanism by a single hand.

5. A safety device according to claim 2 wherein, said rotatable support arm interconnected with said transversely extending pivot shaft is secured to said pivot shaft by only a removable lock pin located adjacent the driver's doorway.

6. A safety device according to claim 2 wherein, said pivotal connection at said other end includes a first spring means connected between said support arm and said crossmember tending to urge said crossmember and said restraint pad toward said intermediate holding position to facilitate their movement to the holding position.

7. A safety device according to claim 2 wherein, said adjustment means includes a second spring means operably connected between said pivot shaft and said support arm for urging said support arm in a longitudinal direction toward said driver to facilitate returning said support arm and said restraint pad to the storage position.

8. A safety device in accordance with claim 2, including
means for automatic operation of said restraint pad from said restraint position to a torso contacting position,
said means for automatic operation comprising,
sensing means for sensing a vehicle accident event effective when said restraint pad is in its restraint position,
power means for moving said restraint pad from said restraint position into contacting engagement with the driver, and
actuation means for actuating said power means upon the sensing of an accident event by said sensing means.

9. A safety device according to claim 8, wherein said actuation means includes
a switching means for releasing said clutch mechanism and contemporaneously actuating said power means upon the sensing of an accident event by said sensing means.

10. A safety device in accordance with claim 9, wherein said power means includes
a source of pressurized fluid,
a fluid-operated cylinder and piston with a rack fixed to said piston,
a control valve actuated by said switching means for selectively applying fluid to said cylinder and piston,
a gear rotatably mounted on said transverse pivot in driven relation to said rack, and
a torsion spring disposed with one end in driving relation to said rotatable support arm and with the other end in driven relation to said gear.

11. A safety device in accordance with claim 10, including
means for applying a positive force to accelerate said release means to release said clutch mechanism,
said power means further includes timing means operatively associated with said switching means for actuating said fluid-operated cylinder and piston and said release means at different times.

12. A safety device in accordance with claim 9, wherein said means includes means for applying a positive force to accelerate said release means to release said clutch mechanism.

13. A safety device in accordance with claim 8, wherein said actuation means includes
test switch means for actuating said power means for testing the operation of said device.

14. A safety device in accordance with claim 8, wherein said device includes
time extension means for automatically extending the period of actuation of said power means upon the sensing of a plurality of successive vehicle accident events by said sensing means for protecting said occupant during the duration of the accident.

15. A safety device in accordance with claim 8, wherein said sensing means comprises an impact sensor.

16. A safety device in accordance with claim 8, wherein said sensing means comprises a distance sensing sensor.

17. A safety device in accordance with claim 8, wherein said sensing means comprises a deceleration sensor.

18. A safety device according to claim 8, wherein said release means being actuatable by said sensing means, said release means is fluid operated,
said power means comprises a source of pressurized fluid, a fluid operated motor operably associated with said adjustment means for rotating said adjustment mechanism upon actuation thereof, and
a control valve actuated by said switching means for selectively applying pressurized fluid from said source to said fluid operated motor and said release means.

19. A safety device in accordance with claim 18, including
switching means for actuating said release means and said power means,
said switching means actuating upon the sensing of an accident event by said sensing means, and
said power means further includes a timing means operably associated with said switching means for actuating said fluid operated motor and said release means at different times.

20. A reusable vehicle safety device adapted for restraining the vehicle driver from movement and being particularly adapted for use while driving in a fog comprising,
a resilient restraint pad,
an adjustment means for operably connecting said restraint pad to a vehicle for manually withdrawing said restraint pad from storage and adjustably positioning said restraint pad in front of and in close proximity with the vehicle driver's torso, and releasably locking it in that position,
means for sequential automatic operation of said restraint pad from said restraint position to a torso contact position,
said means for automatic operation comprising, sensing means for sensing a vehicle accident event, power means for moving said restraint pad into contacting engagement with the driver, and actuating means for actuating said power means upon the sensing of an accident event by said sensing means,
said sensing means comprising a distance sensing sensor, and said sensor including means for providing a warning of an impending vehicle accident event.

21. A reusable vehicle safety device adapted for restraining a vehicle driver from movement and being particularly adapted to permit the driver to vacate his seat in either lateral direction without delay in order to minimize entrapment, said device being capable of operation to emplace, position or remove the same manually, said device comprising, a resilient restraint pad, a transversely extending rigid crossmember supporting said pad thereon, adjustment means for manually adjusting said restraint pad between a restraint position in front of and in close proximity to the driver's torso, and a retracted storage position permitting said driver to vacate his seat in either lateral direction, said adjustment means operatively connecting said transverse crossmember to said vehicle and including, a transversely extending pivot shaft mounted on said vehicle, a rotatable support arm pivotally connected at one end thereof to said pivot shaft to permit rotation of said rotatable arm in a longitudinally extending vertical plane disposed between the occupant's torso and the vehicle's adjacent exterior, between said storage position rearwardly of said driver and a holding position forwardly of said driver, said support arm pivotally connected at the other end thereof to said crossmember to permit rotation of said restraint pad in a transversely extending vertical plane, between said restraint position and said holding position, and a clutch mechanism for releasably locking said device in said restraint position and in said holding position, said clutch mechanism including manually actuated release means for releasing said clutch mechanism to enable movement of said device, whereby said device may be moved between said restraint position, said holding position and said storage position by said driver actuating said release means and moving said device, hand grip means on said crossmember for moving said crossmember and said restraint pad to said holding position in said transversely extending vertical plane, said pivotal connection at said other end of said support arm including a first spring means connected between said support arm and said crossmember tending to urge said crossmember and said restraint pad toward said holding position to facilitate the movement to the holding position, and said adjustment means including a second spring means operably connected between said pivot shaft and said support arm for urging said support arm in a longitudinal direction toward said driver to facilitate returning said support arm and said restraint pad to the storage position, and to restrain said support arm against forward motion when in said storage position.

22. A reusable vehicle safety device adapted for restraining a vehicle driver from movement and being particularly adapted to permit the driver to vacate his seat in either lateral direction without delay in order to minimize entrapment, said device being capable of operation to emplace, position or remove the same manually, said device comprising, a resilient restraint pad, a transversely extending rigid crossmember supporting said pad thereon, adjustment means for manually adjusting said restraint pad between a restraint position in front of and in close proximity to the driver's torso, and a retracted storage position permitting said driver to vacate his seat in either lateral direction, said adjustment means operatively connecting said transverse crossmember to said vehicle and including, a transversely extending pivot shaft mounted on said vehicle, a rotatable support arm pivotally connected at one end thereof to said pivot shaft to permit rotation of said rotatable arm in a longitudinally extending vertical plane disposed between the occupant's torso and the vehicle's adjacent exterior, between said storage position rearwardly of said driver and a holding position forwardly of said driver, said support arm pivotally connected at the other end thereof to said crossmember to permit rotation of said restraint pad in a transversely extending vertical plane, between said restraint position and said holding position, and a clutch mechanism for releasably locking said device in said restraint position and in said holding position, said clutch mechanism including manually actuated release means for releasing said clutch mechanism to enable movement of said device, whereby said device may be moved between said restraint position, said holding position and said storage position by said driver actuating said release means and moving said device, hand grip means on said crossmember for moving said crossmember and said restraint pad by said driver between said restraint position to said holding position and said storage position upon release of said clutch mechanism to enable the driver to vacate his seat in either direction.

* * * * *